March 22, 1949.

P. H. CRAIG 2,465,202

HERMETICALLY SEALED STORAGE BATTERY
WITH GAS RECOMBINING MEANS
Filed Nov. 21, 1946

INVENTOR.
Palmer H. Craig
BY Ralph B. Stewart
ATTORNEY

Patented Mar. 22, 1949

2,465,202

UNITED STATES PATENT OFFICE 2,465,202

HERMETICALLY-SEALED STORAGE BATTERY WITH GAS RECOMBINING MEANS

Palmer H. Craig, Tampa, Fla., assignor to Invex Incorporated, a corporation of Florida Application November 21, 1946, Serial No. 711,348

10 Claims. (Cl. 136—179)

This invention relates to rechargeable storage batteries of the type which are hemetically sealed to prevent the escape of corrosive gases or acids while the battery is being used.

In many uses for storage batteries, the gases which are evolved during the charging and discharging of the battery may be vented to the atmosphere, but there are certain applications in which this cannot be permitted. For example, where storage batteries are used for supplying current to hearing aids, the gas, if allowed to escape, will destroy the clothing of the wearer. Also, in the case of submarines, the gas cannot be allowed to escape into the atmosphere but must be stored or otherwise disposed of.

A broad object of the invention is to devise a sealed storage battery in which certain of the gas components are recombined into water and returned to the battery. This is accomplished by using a catalytic material which is arranged out of contact with the electrolyte.

A further object of the invention is to devise arrangements for preventing the wetting of the catalyst by the electrolyte.

A further object is to devise arrangements for freeing the catalyst of the water resulting from the combining of the gases.

Still another object is to remove the stibine gas from the evolved gases before they reach the catalyst, to thereby prevent the poisoning of the catalyst by the stibine.

Other objects of the invention will be apparent from the following description taken in connection with the accompanying drawing in which Figure 1 is a fragmentary vertical section of the upper part of a battery casing showing one method of supporting a catalyst;

Figure 1:
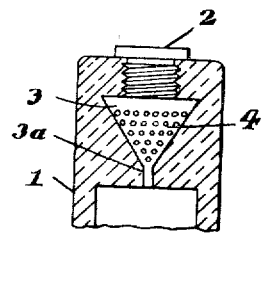

Referring to Fig. 1 the upper part of the battery casing 1 is shown in section and is provided with a screw plug 2 opening into a triangular shaped trough or chamber 3 which contains catalytic material 4, preferably in the form of pellets. The bottom of the trough communicates with the space containing the battery plates through a narrow channel or aperture 3a which permits gases evolved during operation of the battery to enter the chamber 3 and where the hydrogen and oxygen are combined to form water and the water may drain back into the plate space. By arranging the channel 3a to be of narrow width, the catalyst 4 is protected from substantial wetting by the electrolyte in the event the battery is overturned for a short time.

The wetting of the catalyst by the electrolyte may be further guarded against by providing separators for the battery plates having a wick-like action which holds the electrolyte in contact with the battery plates without any excess electrolyte in liquid form. This will be explained later in connection with Figure 5.

For the catalytic material, I prefer to use palladium on alumina in pellet form, although other materials may be employed, such as vanadium pentoxide, or finely divided platinum.

Figure 2:
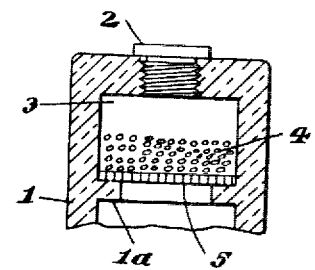
Figure 2 is a similar view showing a second method of supporting the catalyst to prevent wetting by the electrolyte.

In Figure 2, the catalyst 4 is supported within the battery casing above the plate compartment upon a microporous diaphragm 5 resting upon a ledge 1a. The diaphragm 5 may be formed of a microporous sheet of rubber of known construction having very small apertuers which will permit the passage of gas but not the passage of liquid. It may also be formed of a screen of plastic or stainless steel wherein the holes are small enough so that liquid does not penetrate them but are permeable to gases. Microporous material will permit water vapor to return from the chamber 3 to the plate chamber but will not permit the liquid electrolyte to enter the chamber 3.

Figure 3:
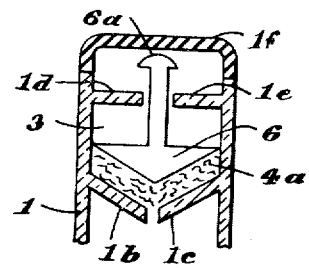
Figure 3 is a similar view showing an arrangement for squeezing the water out of the catalyst.

Figure 3 shows another arrangement provided in the top portion of the battery casing for supporting the catalyst which in this case is formed of platinum or palladium deposited on glass wool or rock wool or other compressible, acid-resistant base 4a. The catalyst is supported upon a pair of inwardly and downwardly sloping bottom walls 1b and 1c for the chamber 3 which form a triangular trough somewhat like that shown in Figure 1. Positioned on top of the wall 4a is a presser block 6 having an upwardly extending stem 6a passing between guides 1d and 1e. The upper end of the stem 6a is positioned immediately below a flexible section of the casing 1 indicated at 1f. This section may be formed of sheet rubber or similar material, and by pressing down on the section 1f, pressure may be exerted on the block 6 through the stem 6a to squeeze the water from the wall 4a. This may be done periodically to free the catalyst of the water which is produced by the catalytic action.

Figure 4:
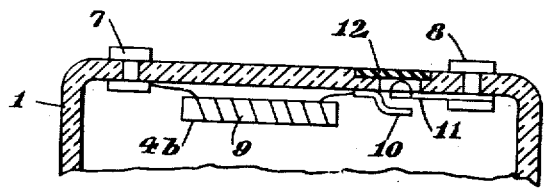
Figure 4 is a fragmentary sectional view of the upper part of a battery casing showing an arrangement for freeing the catalyst of water by an electric heater.

In Figure 4 the catalyst is made in the form of a fiber cord 4b formed as asbestos fiber or rock wool carrying palladium or other catalytic material. This cord is wound with a heater wire 9, one terminal of which is connected to terminal 7 of the battery and the other terminal is connected to switch contact 10. Switch plate 11 is connected with the second terminal 8 of the battery and the operating end of the plate is positioned immediately below a flexible section 12 of the battery casing which may be formed of a sheet of rubber or other flexible material covering an opening in the casing. By pressing on the end of switch plate 11 through the flexible wall 12, a circuit through coil 9 is completed and the water accumulated on the cord 4b will be vaporized.

Figure 5:
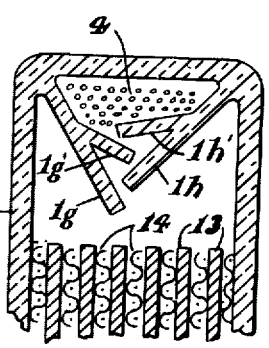
Figure 5 is a view similar to Figure 1 showing another arrangement for supporting the catalyst and involving porous or wick-like separators for the battery plates.

The arrangement for supporting the catalytic material in Figure 5 is somewhat like that shown in Figure 1 in that the material 4 is supported in a triangular trough or chamber formed of side walls 1g and 1h, and these walls are also provided with interleaved baffles 1g' and 1h' which aid in preventing liquid electrolyte from reaching the material 4, in case liquid electrolyte is present. Walls 1g and 1h and baffles 1g' and 1h' constitute an apertured bottom wall for the catalyst chamber. As already explained, I prefer to use separator plates formed of porous material having a wick-like action to hold the electrolyte in completely absorbed condition without any electrolyte being present in free liquid form. In Figure 5, 13 indicates the battery plates which are separated by the separator plates 14. These separator plates may be formed of various porous materials such as glass cloth, glass or mineral wool, or porous rubber plates.

Figure 6A:
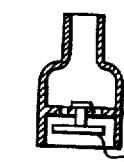
Figure 6a shows a modified form of check-valve useful in Figure 6.
Figure 6:
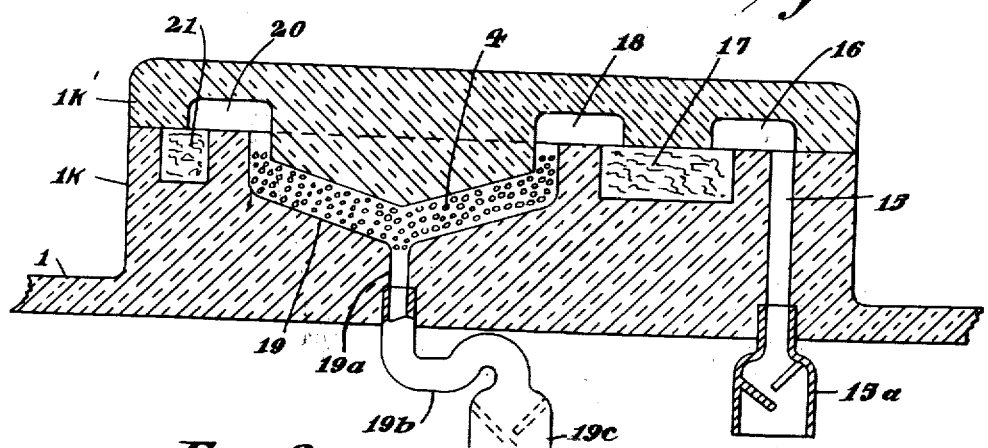
Figure 6 is a vertical sectional view of the top of the battery casing showing the preferred form of the invention which also involves an arrangement for preventing poisoning of the catalyst by stibine gas.

In addition to hydrogen and oxygen, the gases evolved during operation of a storage battery having lead plates also include stibine (SbH₃) which has a "poisoning" effect upon the catalytic material and reduces its effectiveness. In certain types of batteries this effect is not too important, since the catalytic material may be removed at intervals, but in other batteries it is desirable to eliminate this effect as far as possible. In Figure 6 I have shown an arrangement for separating stibine from the gases before they reach the catalyst.

In this arrangement the upper wall of the casing 1 is formed with a thickened portion 1k which is divided along a horizontal plane and has an upper portion 1k' cemented or otherwise sealed to the base portion 1k. The abutting faces of the two portions 1k and 1k' are provided with suitable channels and cavities forming various passageways for the gases and channels for the chemical materials. For example, the gases from the plate space of the battery pass upwardly through passage 15 and are conducted through passage 16 to a chamber 17 containing glass wool which is saturated with a silver nitrate solution. A check valve 15a of suitable construction is provided at the entrance of passage 15 to prevent the entrance of electrolyte in case the battery becomes inverted. This check valve may involve fixed baffles as shown in the drawing, or it may involve a more conventional construction in which a normally open movable valve part 15a' moves to a closed position when the battery is tilted from its upright position as shown in Figure 6a. After passing through chamber 17 the gas is conducted through passage 18 to the chamber 19 which contains the catalyst 4. As will be seen, chamber 19 has downwardly sloping walls leading to a central passage 19a through which the water from the catalytic action may flow to a gooseneck gas trap 19b, and then from the gas trap through an electrolyte trap 19c similar in construction to the trap 15a, to the plate space of the battery. The trap 19b prevents gases from the battery from entering the chamber 19 through the passage 19a, and the check valve 19c prevents electrolyte from entering this chamber through the same passage, but permits the water to pass in the opposite direction.

In passing through the silver nitrate solution carried by the wool in chamber 17, stibine gas is removed from the evolved gases, and only hydrogen and oxygen will be conducted to the chamber 19 containing the catalyst 4. The reaction occurring in the chamber 17 is:

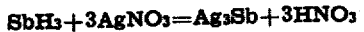

In this formula the first term is stibine gas, the second silver nitrate, the third silver stibnide a black precipitate, and the fourth is nitric acid.

Also, the undesired, similar gas arsine AsH₃ is removed by the reaction

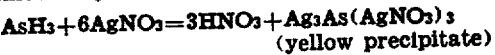
(yellow precipitate)

In this formula the first term is arsine gas, the second silver nitrate, the third nitric acid, and the fourth is a complex salt having no common name but appears as a yellow precipitate.

The remaining gases (hydrogen and oxygen) are now conducted into chamber 19 containing the catalyst where they are combined to produce water, but the proportions are not correct for combination and there is a slight preponderance of hydrogen in the case of the lead-acid type of battery. The excess hydrogen passes out of chamber 19 through passage 20 and into chamber 21 which contains palladium metal of appreciable volume which will absorb several hundred times its own weight in hydrogen.

I claim:
1. A battery containing lead plates immersed in an acid electrolyte and having a gas-tight casing, means for recombining substantially all of the hydrogen and oxygen evolved during gassing of the battery to form water comprising a catalyst enclosed in said casing above said electrolyte, and means for preventing substantial wetting of the catalyst by the electrolyte but allowing access of gases to the catalyst.

2. A battery having a gas-tight casing provided with a flexible wall portion, a catalyst positioned within said casing for combining gases into a liquid, and means operable by pressure applied through said flexible wall section for freeing said catalyst of said liquid.

3. A battery according to claim 2 wherein said catalyst is carried by a compressible fibrous material, and said liquid freeing means comprises a presser element positioned adjacent said flexible wall section and being movable through said section to compress said fibrous material.

4. A battery according to claim 2 wherein said liquid freeing means comprises an electric heater for vaporizing said liquid and including a switch for energizing said heater, said switch being positioned adjacent said flexible wall section and being operable therethrough.

5. A battery having lead plates enclosed in a gas-tight casing containing an acid electrolyte, a catalyst enclosed in said casing above said plates, and means for preventing wetting of said catalyst by said electrolyte comprising separator plates formed of wick-like material for retaining substantially all of said electrolyte in absorbed state.

6. In combination, a storage battery having a gas-tight casing containing lead plates and an acid electrolyte, a catalyst located in a separate chamber within said casing and connected by a passage with the plate chamber of the casing, said catalyst serving to combine the hydrogen and oxygen components of the gases evolved during operation, said gases including a component which is poisonous to said catalyst, and a chemical substance located in said passage for combining with said poisonous gas and thereby preventing said poisonous gas from reaching said catalyst.

7. A combination according to claim 6 in which there is an excess of hydrogen from the catalytic action, and including a chemical substance for absorbing said excess of hydrogen.

8. In combination, a storage battery having a gas-tight casing, a chamber containing a catalyst, means for conducting gas from said battery casing to said chamber and including a filter formed of fibrous material saturated with silver nitrate, and means for conducting water from said catalyst chamber back to said battery casing.

9. A combination according to claim 8 and including a quantity of metallic palledium exposed to gases which have passed through said catalyst for absorbing the excess hydrogen resulting from the catalytic action.

10. A battery comprising a gas-tight casing, an apertured wall located within said casing below the top wall thereof and dividing said casing into a lower main chamber and a smaller upper chamber, lead plates and an acid electrolyte located in said lower chamber, and means for recombining substantially all of the oxygen and hydrogen evolved during gassing of the battery to form water comprising a catalytic material located in said upper chamber, said apertured wall serving to retain said material in said upper chamber while permitting access of gases to the material in said upper chamber and permitting the return of said water to said lower chamber.

PALMER H. CRAIG.

REFERENCES CITED

The following references are of record in the file of this patent:

UNITED STATES PATENTS

| Number | Name | Date |
|---|---|---|
| 729,100 | Sperry | May 26, 1903 |
| 1,155,047 | Crowdus | Sept. 28, 1915 |
| 1,324,797 | Chubb | Dec. 16, 1919 |
| 2,051,039 | Guthrie | Aug. 18, 1936 |
| 2,131,592 | Lange et al. | Sept. 27, 1938 |
| 2,221,542 | Hopkins | Nov. 12, 1940 |
| 2,269,040 | Rublee | Jan. 6, 1942 |
| 2,318,371 | Bushman | May 4, 1943 |

FOREIGN PATENTS

| Number | Country | Date |
|---|---|---|
| 746 | Great Britain | Jan. 15, 1889 |
| 22,281 | Great Britain | 1911 |
| 369,172 | France | Nov. 3, 1906 |

OTHER REFERENCES

Mellor Comprehensive Treatise on Inorganic and Theoretical Chemistry, vol. 9 (1929), pages 398–399.